United States Patent Office 3,614,873
Patented Oct. 26, 1971

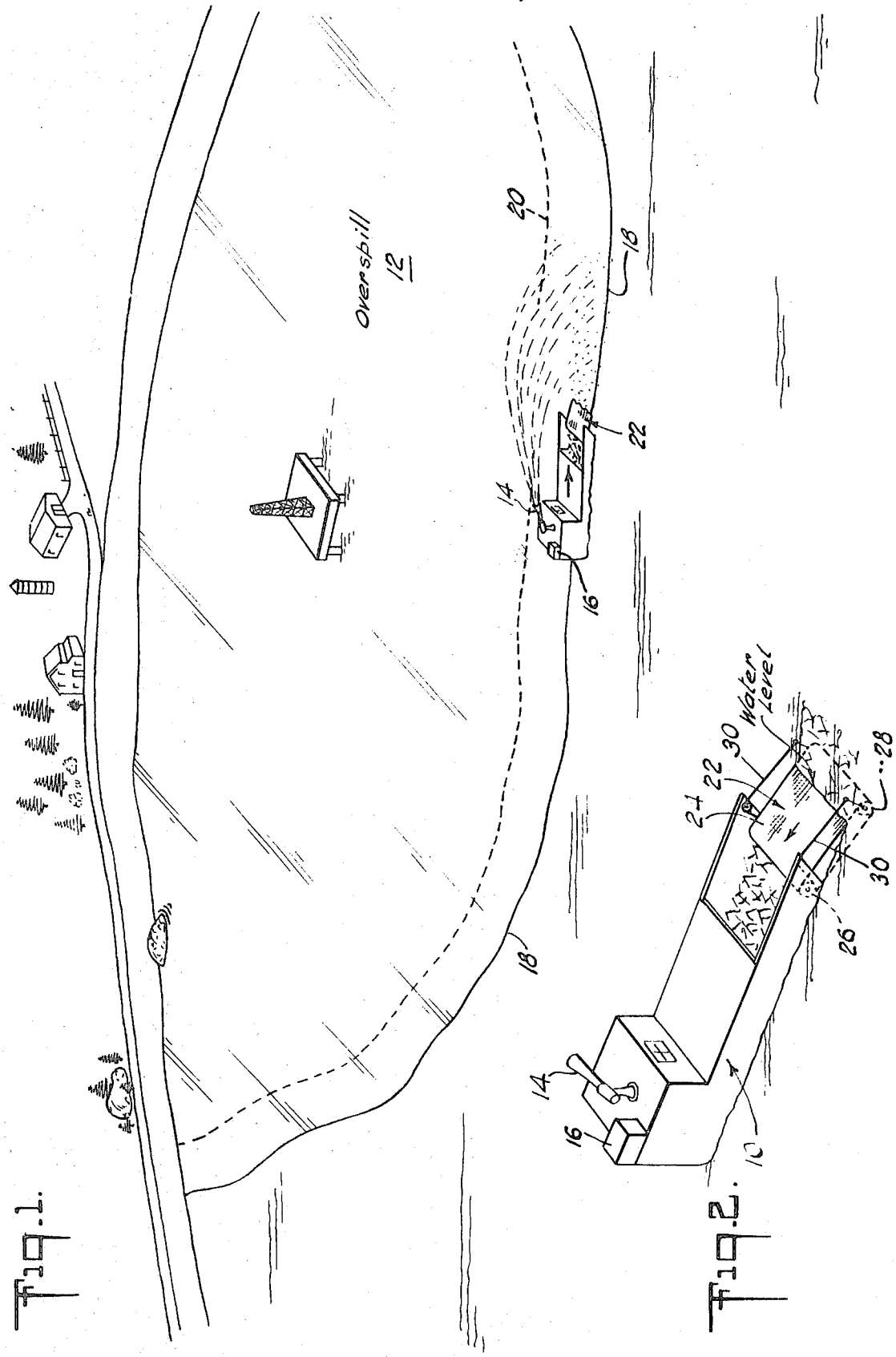

3,614,873
FREEZING OIL SPILLS
Edward L. Cole, Fishkill, and Howard V. Hess, Glenham, N.Y., assignors to Texaco Inc., New York, N.Y.
Filed Oct. 1, 1969, Ser. No. 862,716
Int. Cl. F25c 5/00
U.S. Cl. 62—66                 6 Claims

ABSTRACT OF THE DISCLOSURE

Cleaning up marine oil spills by freezing the surface layer of oil, preferably with particles of Dry Ice or the like, to enable the layer to be screened off the surface as a cake.

---

The present invention relates to controlling oil spills and particularly cleaning up oil accidentally released in marine areas, namely on the surface of water. The invention particularly has to do with cleaning up spills of relatively heavy oil fractions such as crude oil.

BACKGROUND OF THE INVENTION

It is well established that the release of oil on the surface of the sea presents a formidable problem of clean-up and recovery, and in spite of numerous proposals directed to the solution of this problem, no infallible technique has been presented.

The problem, difficult under the best of circumstances, tends to become insoluble in the presence of a seaway, or of winds and currents which tend to move and disperse the spill widely over uncontrolled areas and to attenuate it to the point where quantitative pickup is difficult.

For this reason there is an urgent demand for a simple, economical method for controlling massive oil spills promptly before they have had an apportunity to disperse widely on the surface of the water.

PRESENT INVENTION

The present invention contemplates controlling massive oil spills particularly of crude oil or relatively heavy oil fractions by freezing, that is to say, thickening the oil layer by a freezing or chilling action to a point where the oil forms a cake which can be picked up on screens or the like and mechanically removed from the surface of the water.

Actually the present inventors have discovered and demonstrated that this freezing effect can be realized by contacting the spill with reasonable proportions of solid carbon dioxide, namely so-called Dry Ice, at a cost which is within economic boundaries.

Applicants have further discovered that the contact of the Dry Ice with the oil layer effects a prompt chilling action such that within a surprisingly brief period of time the oil can be removed as a solid or semi-solid cake on a flexible screen of conventional type.

It has yet further been discovered that by selection of solid, frozen carbon dioxide of appropriate particle size, these particles, together with the oil, will float on the surface of the water. To be somewhat more specific, as long as the particles do not substantially exceed approximately ¼″ in dimension they can be cast or distributed rather widely upon an oil spill without breaking through the oil layer, but tend to remain intimately associated therewith until freezing is completed.

As also intimated above, the present invention is of particular advantage in that a massive spill can be largely immobilized by prompt action so that spreading is prevented while the spill occupies a relatively thick layer and before it has an opportunity to attenuate widely on the surface of the water. Thus, for example, the Dry Ice particles can be broadcast along the margin of the spill and for a reasonable distance inwardly therefrom. This, in effect, creates an immobile peripheral barrier which affords time, after the barrier is created, and while it is being picked up to reach the inner portions of the spill.

Accordingly any suitable broadcasting means, such as a pneumatic gun, may be maintained either on vessels from which the spill is likely, or upon attendant, ancillary vessels in the area.

The present invention therefore has the special advantage of preventing a massive oil spill from spreading over increasingly wide areas with attendant spread of pollution.

BRIEF DESCRIPTION OF THE DRAWINGS

FIG. 1 is a diagrammatic view of the present invention showing a body of water, an oil slick thereon and a means of distributing Dry Ice crystals around the periphery of said slick.

FIG. 2 is a perspective view of a means of removing the conglomerate oil and ice from the body of water.

DETAILS OF THE INVENTION

In order to exemplify the invention by means of one specific embodiment, reference is made to the accompanying drawing which illustrates more or less diagrammatically a perspective view of a vessel 10 undertaking the clean-up of an oil spill in accordance with the present invention. The spill is shown more or less diagrammatically as in 12, presumably having so recently occurred that it is, in effect, a massive and relatively thick layer of oil just commencing to spread. Vessel 10 which, in the embodiment shown, takes the general form of a military landing vessel, is provided on an upper deck portion with a gun or projector 14, adapted to broadcast or project particulate material controlledly over a substantial distance.

The details of such gun, being well known in the art, from no specific part of the present invention and are not disclosed herein other than to say that the gun is continuously and regularly supplied with particulate Dry Ice or frozen carbon dioxide, from any suitable source, not shown, in the form of granules of about $\frac{1}{32}$ to $\frac{5}{32}$ inch average particulate dimension. The gun in the present invention may be supplied with a continuous source of compressed air 16 to project the particles or may use the pressure of sublimed Dry Ice.

The operator, by aiming the gun, continuously directs the particles of carbon dioxide just inside the margin of the spill as indicated at 18, so that they first reach and cover a marginal area inside the periphery to the point represented by the dotted line 20.

Sufficient of the particles are cast in this marginal area to form a frozen barrier and thus confine the unfrozen oil. When this has been done, steps are taken to pick up and recover the frozen oil, at the same time continuing to broadcast the freezing agent into the central, unfrozen portions of the oil spill, as well as in the frozen marginal portions to supplement and continue the freezing effect on the oil which has not yet been recovered.

While the pick-up of the frozen or semi-solid oil may be handled in various ways, as for example, by surface plows, skimmers or the like, the applicants prefer to do this by means of a travelling screen such as that arranged at the bow portion of the vessel or landing barge 10 and indicated by the reference numeral 22.

The present screen comprises a continuous belt 24 of screening material, such for example as 1/8" mesh bronze screening which rides on rollers 26 and 28. The rollers 26 and 28 are mounted on a rigid internal frame not shown, which is pivotally attached at its rear to the bow of the landing barge. Actually the assembly may be pivoted on the axis of roller 26 which extends athwartships and is located above the water level and rotated continuously by a drive motor not shown, in such a direction that the upper run of the screening moves continuously into the vessel. The forward roller 28 is located outwardly of the bow and preferably lowered into the water by means of cables 30. As a result, therefore, the outer end of the screen as it passes over the roller 28 dips into the water below the frozen oil cake, which is deposited on the upper surface of the mesh as the vessel moves forward and is conveyed into the vessel as indicated.

F. or below and the sun's radiation relatively low, as for example, in the North Atlantic or Pacific, and where and when cloud cover is substantial. Accordingly, the invention is open to a certain amount of personal judgment is evaluating its economic prospects for any given conditions. For example, in Monterey Bay, Calif., with an average water temperature of 54.3° F. and very little cloud cover, the recovery of Arabian Crude would obviously require considerably greater dosage of Dry Ice than would be required to clean up, for example, Nafoora Crude or California Reduced Crudes.

In the development of the foregoing principles the present applicants have evolved a laboratory test procedure for evaluating the economic prospects of respective oils. A layer of oil at a temperature of 100° F. is gently deposited on a solution of synthetic sea water in a battery jar. The approximate area of the oil slick is noted and then sprinkled with a weighed portion of Dry Ice pellets. The granules or pellets have an approximately 1/32–3/32 inch average particle diameter. The slick is then allowed to stand a measured time, after which its condition is noted and the oil lifted from the surface, using a 1/8 inch wire mesh screen.

In the following table are listed a series of typical hydrocarbon oils employed in tests conducted for the purpose of estimating the relative effectiveness of the present invention on such hydrocarbons under different conditions. Along with the seven representative oils are listed their respective inspection tests.

|  | Sample | | | | | | |
|---|---|---|---|---|---|---|---|
|  | Nafoora crude | Arabian crude | Middle East crude | California reduced crude | Arabian reduced crude | 50:50 wt. percent blend Calif. reduced crude and Arabian crude | 75:25 wt. percent blend Calif. red. crude and Arabian crude |
| Sample Number | BRL-69-1095T | BRL-62-3027 | L-69-63F | BRL-64-504 | BRL-68-156 | L-69-101A | L-69-101B |
| Gravity, ° API | 33.0 | 27.0 | 29.3 | 15.8 | 13.5 | 20.7 | 18.1 |
| Flash, COC, ° F | 105 | | | | | | |
| SUS viscosity at— | | | | | | | |
| 100° F | 119 | 39.4 | 35.1 | b 7,850 | b 5,500 | 112.5 | 300.7 |
| 122° F | | | | 261.3 | | | |
| 130° F | 64.9 | | | | | | |
| 150° F | | | | | 361.3 | | |
| 210° F | | | | 157.1 | 68.5 | | |
| Carbon residue, wt. percent | 3.94 | 5.55 | | | | | |
| Sulfur, wt. percent | 0.12 | 3.2 | 1.7 | | | | |
| Nitrogen, wt. percent | 0.087 | | | | | | |
| Pour point ° F | +80 | +35 | +40 | +75 | +45 | +35 | +55 |
| DPI dist. wt. percent: | | | | | | | |
| IBP–122° F | 0.5 | | | | | | |
| 122–350° F | 4.8 | | | | | 17 | |
| 350–650° F | 35.0 | | | | | | |
| 650–850° F | 17.5 | | | | | | |
| 850° F.+ | 38.6 | | | | | 83 | |
| Gas oil dist. ° F.: | | | | | | | |
| IBP | | 130 | | 520 | | | |
| 10 | | 270 | 303 | 606 | | | |
| 20 | | 300 | 424 | 648 | | | |
| 30 | | 507 | 510 | 666 | | | |
| 40 | | c 530 at 33 | 611 | 676 | | | |
| 50 | | | 670 | 684 | | | |
| 60 | | | 683 | 697 | | | |
| 70 | | | 700 | c 700 | | | | b=Extrapolated.    c=Cracked.

The present invention, as above intimated, is of specific application to relatively heavy oils such as heavy crude oils or reduced crudes or relatively heavy ends such as the heavier grades of fuel oil which have a substantial "thickness" and viscosity and thus tend to be more readily immobilized by freezing so that they can be removed as a solid or semi-solid cake.

While it is obviously not to be expected that the invention will always be economical or desirable in tropical waters under intense short wave sun radiation or in the case of relatively light hydrocarbon liquid, such as naphtha or a high naphtha crude, in many of the commercially active waters of the world, the invention can be practised economically and effectively, particularly where water temperatures are, for example, around 50°

In conducting the test procedure, the synthetic or artificial sea water is made by the procedure of Brujewicz [1] as follows:

|  | Grams |
|---|---|
| Sodium chloride | 265 |
| Magnesium chloride | 24 |
| Magnesium sulfate | 33 |
| Calcium chloride | 11 |
| Potassium chloride | 7 |
| Sodium bicarbonate | 2 |
| Sodium bromide | 0.8 | made up to a solution totalling 10,000 grams with distilled water and placed in the battery jar.

[1] Sverdrup et al., "The Oceans," Prentice-Hall, Inc., 1942.

The experimental data resulting from the foregoing tests is as follows:

| Test No. | Water Temp., °F. | Oil spill, grams | Approx. area of spill, sq. in. | Dry Ice, grams | Time,[1] min. | Oil recovery, grams[2] | Oil pick-up, percent |
|---|---|---|---|---|---|---|---|
| Example I.—Nafoora crude at 110° F. in sea water ||||||||
| 1 | 44 | 18 | 12 | 2 | 1 | 20 | 100 |
| 2 | 49 | 20.8 | 11 | 1 | 2 | 23 | 100 |
| 3 | 47 | 32 | 16 | 2 | 2 | 34 | 100 |
| 4 | 47 | 32 | 18 | 2 | 60 | 35 | 100 |
| 5 | 50 | 33 | 16 | None | | Oil dripped from screen on pick-up | |
| 6 | 67 | 17 | 9 | 2 | 2 | | 100 |
| 7 | 67 | 15 | 9 | 2 | 1 | | 100 |
| 8 | 67 | 37 | 45.5 | 4 | 1 | | 100 |
| 9 | 68 | 18 | 14 | 2 | 200 | Oil dripped from screen on pick-up | |
| Example II.—Arabian crude at 110° F. in sea water ||||||||
| 1 | 48 | 28 | 68 | 7 | 2 | | 25 |
| 2 | 48 | 24 | 56 | 7 | 1 | | 50 |
| 3 | 48 | 20 | 48 | 6 | 1 | | 60 |
| 4 | 50 | 24 | 64 | 15 | 1 | | 85 Screen dripped on pick-up |
| 5 | 68 | 16 | 17.5 | 3.5 | 1 | | None |
| 6 | 69 | 18 | 20 | 4 | 2 | | None |
| 7 | 69 | 12 | 12 | 3 | 1 | | None |
| Example III.—California reduced crude at 130° F. on sea water ||||||||
| 1 | 68 | 30 | 20 | 3 | 1 | | 100 |
| 2 | 68 | 20 | 15 | 2 | 2 | | 100 |
| 3 | 69 | 10 | 8 | 3 | 1 | | 100 |
| 4 | 69 | 20 | 13 | None | | | [3]80 |
| Example IV.—Middle East crude at 110° F. on sea water ||||||||
| 1 | 46 | 19 | 42 | 8 | 1 | | 85 |
| 2 | 47 | 11 | 9 | 4 | 1 | | 90 |
| 3 | 49 | 8 | 6 | 4 | 60 | | 30 |
| 4 | 50 | 26 | 60 | None | | | 30 |
| 5 | 67 | 30 | 16 | 3 | 1 | | 70 |
| 6 | 67 | 26 | 16 | 3 | 2 | | 30 |
| 7 | 67 | 20 | 16 | None | | | None |
| Example V.—Nafoora crude at 110° F. in fresh water ||||||||
| 1 | 44 | 17 | 12.3 | 1.5 | 1 | 19 | 100 |
| 2 | 45 | 26 | 14 | 1.5 | 2 | 29 | 100 |
| 3 | 49 | 21 | 12 | 1.0 | 2 | 22 | 100 |
| 4 | 50 | 35 | 30 | None | | Oil dripped from screen on pick-up | |
| Example VI.—50:50 Calif. reduced crude and Arabian crude, L-69-101A on sea water ||||||||
| 1 | 47 | 12 | 38 | 5 | 2 | | 100 |
| 2 | 47 | 13 | 38 | 5 | 2 | | 100 |
| 3 | 48 | 14 | 50 | 3 | 2 | | 75 |
| 4 | 48 | 13 | 50 | 3 | 2 | | 75 |
| 5 | 68 | 14 | 38 | 3 | 2 | | 60 |
| 6 | 68 | 15 | 38 | 3 | 2 | | 70 |
| 7 | 68 | 17 | 50 | 5 | 2 | | 95 |
| 8 | 69 | 20 | 50 | 5 | 2 | | 95 |
| Example VII.—75:25 Blend Calif. reduced crude and Arabian crude, L-69-101B ||||||||
| 1 | 48 | 14 | 19.5 | 3 | 2 | | 100 |
| 2 | 48 | 15 | 19.5 | 3 | 2 | | 100 |
| 4 | 68 | 15 | 28 | 3 | 2 | | 100 |
| 5 | 68 | 13 | 28 | 3 | 2 | | 100 |
| Example VIII.—Reduced Arabian Crude, BRL-68-156 ||||||||
| 1 | 68 | 19 | 12.5 | 3 | 2 | | 100 |
| 2 | 68 | 20 | 16 | 3 | 2 | | 100 |

[1] Between adding Dry Ice and removal of oil from water.
[2] Weight of oil and water removed by screen.
[3] Dripping.

The foregoing data demonstrate the relative effectiveness and economy of the present invention for enabling the prompt immobilization of appropriate oils and their subsequent removal from water.

For example, in the case of Nafoora Crude it is apparent that prompt and complete recovery can be effected in a minute or so with relatively small proportions of Dry Ice. On the other hand at a water temperature of 68° F. the oil, after 200 minutes of elapsed time, had apparently thawed to the condition where it could not be picked up by the screen. Accordingly therefore, prompt action is advisable to prevent warm water from thawing the oil cake. Conversely in cold, northern waters, as in Puget Sound, the operation is greatly facilitated.

Arabian Crude obviously tends to require a greater expenditure of Dry Ice whereas California Reduced Crude, even when introduced at 130° F., can be removed quite easily.

From the foregoing it is apparent that reasonable expenditures of frozen carbon dioxide can effect prompt freezing of oil layers which, by reasonably prompt action can be recovered and separated from the surface of the water.

As previously mentioned, it has been further observed that Dry Ice pellets of approximately ¼ inch or greater, when projected or dropped on an oil slick, tend to burst through the oil layer and drop to the bottom of the water. This, of course, impairs realization of the benefits of the present invention. On the other hand pellets less than ¼ inch, as for example, from 1/32 to 1/8 inch particle size invariably remain floating on or in the oil layer in such a manner as to be effective in immediately freezing the oil.

Applicants do not wish to undertake the responsibility for explaining this phenomenon, inasmuch as solid $CO_2$ has a specific gravity of 1.56 as against an oil density of somewhat les than 1 and a sea water density of about 1.025. Nevertheless it is felt that the smaller particles ride or float on the oil layer due to a combination of factors that overcome the gravity difference, possibly as follows:

(1) Prompt formation of thickened or solid oil cake in the area of the $CO_2$ particles which acts as a float for the pellet;

(2) The possibility that gas liberated from the surface of the oil-$CO_2$ interface tends to buoy up the pellets, and (3) The effect of surface tension.

In any event one or more of these factors or others are sufficient to overcome the gravity differentials in the case of particles smaller than 1/4 inch diameter.

As also intimated, while the oil cake can be picked up by any mechanical means, it is preferred herein to employ a screen which has the particular advantage of effecting a relatively clean separation with a minimum entrainment of sea water.

From the foregoing, one of the important advantages of the present invention is the prompt containment and control of large spills, first by circling the spill to set up a relatively rigid barrier of frozen cake followed by immediately picking up this layer and at the same time projecting a succeeding inner belt of frozen $CO_2$ to create a second barrier which, in turn, may be picked up as the process is continued, until the entire mass of the spill is recovered. This is accomplished by virtue of the fact that freezing of the oil layer is phenomenally rapid.

The word spill as used herein means broadly the undesired presence of oil and particularly hydrocarbon oil on the surface of a body of water, regardless of how this condition arose whether, for example, by leakage from above or from a subterranean reservoir.

We claim:

1. The method of cleaning up marine oil spills involving a layer of oil floating on a body of water wherein particles of Dry Ice are uniformly spread about the surface of the oil spill in a relative proportion effective to cause a relatively prompt rigidification of the oil to form a cake-like layer and thereafter removing said layer from the surface of the water.

2. The method as called for in claim 1 wherein said cake is removed from the water by mechanically lifting it on a wire screen.

3. The method as called for in claim 2 wherein said oil spill comprises a relatively heavy oil such as a heavy crude which cakes readily in the presence of Dry Ice particles, and wherein the operation is conducted at a water temperature below about 50° F.

4. The method of cleaning up marine oil spills involving a layer of oil on the surface of water which comprises localizing said spill by uniformly distributing along the marginal portions of said spill a finely divided solid carbon dioxide Dry Ice in particle form and in sufficient proportion to freeze and thicken said oil layer to a combination of essential immobility and to form a cake, thereby to confine the central portions of said spill and restrict the spread thereof, continuously recovering said immobilized and frozen cake of oil by mechanical separation and additionally immobilizing interior portions of said spill.

5. The method according to claim 4 wherein said Dry Ice is in the particle range less than 1/4".

6. The method as called for in claim 4 wherein said Dry Ice is in the particle range of 1/32" to 1/8".

References Cited

UNITED STATES PATENTS

| | | | |
|---|---|---|---|
| 3,219,190 | 11/1965 | Thune | 210—242 |
| 3,491,023 | 1/1970 | McCormick | 210—242 |
| 3,503,512 | 3/1970 | Desty et al. | 210—242 |

MEYER PERLIN, Primary Examiner

R. C. CAPOSSELA, Assistant Examiner

U.S. Cl. X.R.

62—123; 210—71, 242